(12) United States Patent
Horng et al.

(10) Patent No.: US 6,481,974 B2
(45) Date of Patent: Nov. 19, 2002

(54) FAN MOTOR WITH CONSTANT SPEED CONTROL BY A MICROPROCESSOR SYSTEM

(75) Inventors: Alex Horng, Kaohsiung (TW); Nan Long Tsai, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/783,564

(22) Filed: Feb. 15, 2001

(65) Prior Publication Data

US 2002/0110457 A1 Aug. 15, 2002

(51) Int. Cl.[7] ............................................. F04B 49/00
(52) U.S. Cl. .................... 417/42; 417/44.1; 318/779; 388/800
(58) Field of Search ..................... 417/42, 44.1, 45; 318/461, 779; 388/800, 801, 806

(56) References Cited

U.S. PATENT DOCUMENTS

| | | | | |
|---|---|---|---|---|
| 4,065,725 A | * | 12/1977 | Lillis et al. ................. | 330/254 |
| 4,705,457 A | * | 11/1987 | Belusa ......................... | 417/22 |
| 4,722,669 A | * | 2/1988 | Kundert ....................... | 417/32 |
| 4,779,031 A | * | 10/1988 | Arends et al. .............. | 318/565 |
| 5,249,741 A | | 10/1993 | Bistline et al. | |
| 5,422,557 A | * | 6/1995 | Lee et al. ................... | 318/807 |
| 5,727,928 A | * | 3/1998 | Brown ..................... | 417/44.11 |
| 6,040,668 A | * | 3/2000 | Huynh et al. ................ | 318/471 |
| 6,073,206 A | * | 6/2000 | Piwonka et al. ............. | 711/102 |
| 6,128,732 A | * | 10/2000 | Chaiken ........................ | 713/2 |
| 6,188,189 B1 | * | 2/2001 | Blake ........................... | 318/471 |
| 6,318,965 B1 | * | 11/2001 | Nair .............................. | 417/2 |
| 6,340,874 B1 | * | 1/2002 | Vladimir ..................... | 318/471 |

\* cited by examiner

Primary Examiner—Charles G. Freay
Assistant Examiner—Han L. Liu
(74) Attorney, Agent, or Firm—Bacon & Thomas

(57) ABSTRACT

A fan motor with constant speed control comprises a microprocessor system, a bus control logic, a register for actual fan speed, a register for fan state, a register for speed set-up, a linear variable voltage circuit control logic, and a braking/running enabling control logic. The microprocessor system is connected via the bus control logic to the register for actual fan speed, the register for fan state, and the register for speed set-up. The register for fan state sets up enabling of braking and running by means of controlling output voltage by the braking/running enabling control logic. The register for speed set-up sets up speed values by the microprocessor system. After comparing a speed value to an actual fan speed signal by the linear variable voltage circuit control logic, the linear variable voltage circuit control logic generates a linear variable voltage (drive voltage) which is outputted to the fan via the braking/running enabling control logic. The actual fan speed signal is accumulated in the linear variable voltage circuit control logic and then outputted to the register for actual fan speed for retrieval by the microprocessor system via the bus control logic.

3 Claims, 2 Drawing Sheets

FAN MOTOR WITH CONSTANT SPEED CONTROL BY A MICROPROCESSOR SYSTEM

BACKGROUND OF THE INVENTION

1. Field of the Invention

The present invention relates to a fan motor with constant speed control by a microprocessor system, and more particularly to a fan motor whose speed is controlled by a microprocessor system and other peripheral controllers to modulate the drive voltage for the fan, thereby keeping the fan running at a predetermined speed.

2. Description of the Related Art

Heat-dissipating fans are generally used to cool computer systems and electronic equipment thereof to thereby avoid failure of the systems and/or burning of electronic elements due to over-temperature resulting from poor heat dissipation. Acoustic noise is inevitably generated during high-speed operation of the heat-dissipating fan and thus adversely affects the user's efficiency.

Fan speed must be varied in response to a change in the temperature in the system. System failure and/or burning of electronic elements occur if the change in the fan speed mismatches the ambient temperature. When in a high-temperature ambience and the fan speed is increased too fast and renders sudden reduction in the ambient temperature, the fan speed must be reduced which will cause a rise in the temperature and the fan speed must be increased again. As a result, the fan speed is repeatedly increased and reduced in response to the change in the ambient temperature. Mismatch between the fan speed and the temperature causes a waste in electricity, system failure, and/or burning of electronic elements. It is therefore necessary to develop constant speed heat-dissipating fans to keep the fan running at a constant speed, thereby providing a constant ambient temperature.

A conventional fan motor is shown in FIG. 1 of the drawings that correspond to FIG. 3 of U.S. Pat. No. 5,249,741 to Bistline et al. issued on Oct. 25, 1993. FIG. 1 is a flowchart illustrating how the speed values are determined for each fan. In step 10, the IPLROS (initial program load read only storage) queries the I/O slots to determine what option cards may be in the I/O slots. In step 11, the NVRAM (non-volatile random-access memory) is queried to determine if a previous configuration for the computer is stored there. In step 12, a thermal table is queried to determine the base cooling requirements for each bay of the computer system and the cooling requirements for each of the components. In step 13, the speed value for each of the fans is determined. In step 14, the system configuration including the location of the option cards and the speed values for each fan are stored in NVRAM for future reference. In step 15, the speed values are stored in four bit registers which value is then converted by a digital-to-analog converter into an analog value. In step 16, the current configuration is compared to the previous configuration including location of the various option cards to determine if the configuration has changed.

However, the automatic fan speed control disclosed in U.S. Pat. No. 5,249,741 can only update the thermal table by means of using the operating system to thereby determine the fan speed. Parameters such as fan state, actual speed, and fan speed set-up that may affect control of constant ambient temperature in the system are not taken into consideration.

Other objects, specific advantages, and novel features of the invention will become more apparent from the following detailed description and preferable embodiments when taken in conjunction with the accompanying drawings.

SUMMARY OF THE INVENTION

In view of the above drawback, the present invention provides a fan motor that uses parameters of actual speed to determine fan state and speed set-up, thereby outputting a drive voltage with a smooth waveform. The drive voltage allows match between the fan actual speed and the fan state, thereby keeping the fan running at a constant speed.

A fan motor with constant speed control comprises a microprocessor system, a bus control logic, a register for actual fan speed, a register for fan state, a register for speed set-up, a linear variable voltage circuit control logic, and a braking/running enabling control logic. The microprocessor system is connected via the bus control logic to the register for actual fan speed, the register for fan state, and the register for speed set-up. The register for fan state sets up enabling of braking and running by means of controlling output voltage by the braking/running enabling control logic. The register for speed set-up sets up speed values by the microprocessor system. After comparing a speed value to an actual fan speed signal by the linear variable voltage circuit control logic, the linear variable voltage circuit control logic generates a linear variable voltage (drive voltage) which is outputted to the fan via the braking/running enabling control logic. The actual fan speed signal is accumulated in the linear variable voltage circuit control logic and then outputted to the register for actual fan speed for retrieval by the microprocessor system via the bus control logic.

DETAILED DESCRIPTION OF THE PREFERRED EMBODIMENT

A preferred embodiment in accordance with the present invention will now be described with reference to the accompanying drawings.

Figure 2:
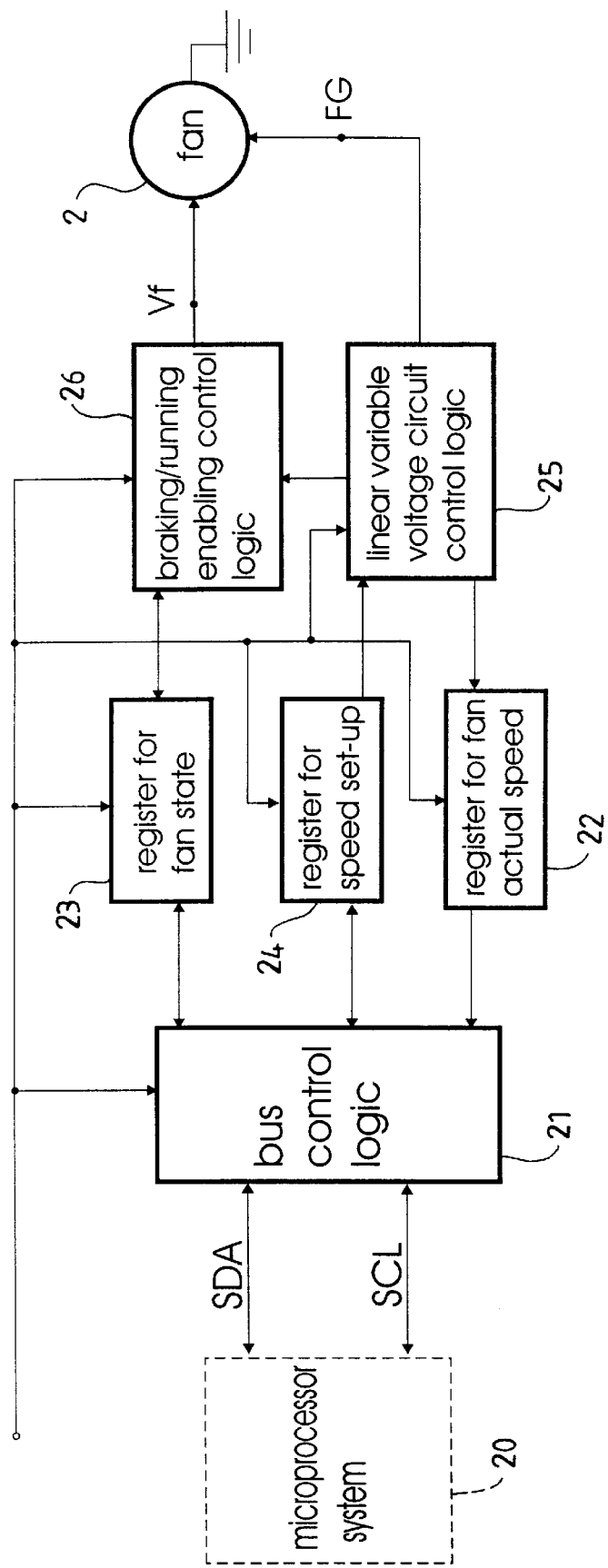
FIG. 2 is a block diagram of a preferred embodiment of a fan motor in accordance with the present invention that uses a microprocessor system to provide a constant speed control.

Referring to FIG. 2, a fan motor in accordance with the present invention generally includes a microprocessor system 20, a bus control logic 21, a register 22 for actual fan speed, a register 23 for fan state, a register 24 for speed set-up, a linear variable voltage circuit control logic 25, and a braking/running enabling control logic 26. The microprocessor system 20 is mounted between a power source Vcc and a fan 2 for controlling output of a drive voltage Vf for driving the fan 2. The bus control logic 21 serves as a communication interface of the microprocessor system 20, which communication interface is preferably an I$^2$C Bus (inter-integrated circuit) or SM (system management) Bus that provide communication by SDA (series data) and SCL (series clock) and that are connected to the register 22 for actual fan speed, the register 23 for fan state, and the register 24 for speed set-up.

The linear variable voltage circuit control logic 25 is connected between the register 22 for actual speed and the fan 2. In addition, the linear variable voltage circuit control logic 25 is connected between the braking/running enabling control logic 26 and the register 24 for speed set-up. The braking/running enabling control logic 26 controls a drive voltage Vf outputted to the fan 2 from the linear variable voltage circuit control logic 25.

The microprocessor system 20 retrieves data stored in the registers 22, 23, and 24 for processing, and the processed data are outputted to the registers 23 and 24, wherein the data regarding fan state is stored in the register 23 and the data for altering the speed/drive voltage Vf is stored in the register 24. The fan 2 is started with the implied values for starting the system such as braking/running enabling and speed data, thereby starting the fan 2 to rotate. During operation of the fan 2, the linear variable voltage circuit control logic 25 samples the input clock (CLK) to the fan as a sample frequency, and the detected fan actual speed signal FG is outputted to the register 22 for actual fan speed for retrieval by the microprocessor system 20.

The fan state data in the register 23 for fan sate is used via braking/running control of the fan 2 to detect and control braking/running enabling and speed alarming. The varying data of speed/drive voltage Vf in the register 24 for speed set-up is used by the linear variable voltage circuit control logic 25 to output a linear variable voltage to the braking/running enabling control logic 26. At this time, the linear variable voltage is a drive voltage that fluctuates in a linear, smooth way. On the one hand, the control logic 26 controls output of fan state set-up to thereby control braking/running enabling, speed alarming, etc. On the other hand, the control logic 26 controls output of drive voltage Vf to the fan 2 to thereby keep the fan 2 running at a constant speed.

The present invention uses a microprocessor system 20 to retrieve and handle the detected fan speed signal data in the register 22 for actual fan speed, and fan state data and speed data for keeping the fan running at a constant speed are then retrieved from the register 23 for fan state and the register 24 for speed set-up. In addition, in a case that the fan speed is lower than a predetermined constant speed set by the system, an appropriate drive voltage Vf must be outputted to alter the speed. Thus, the drive voltage Vf also varies linearly and continuously to thereby form a smooth waveform for keeping the fan running at a constant speed. The fan 2 of the present invention can be used in any equipment that requires constant speed control, such as a server.

Figure 1:
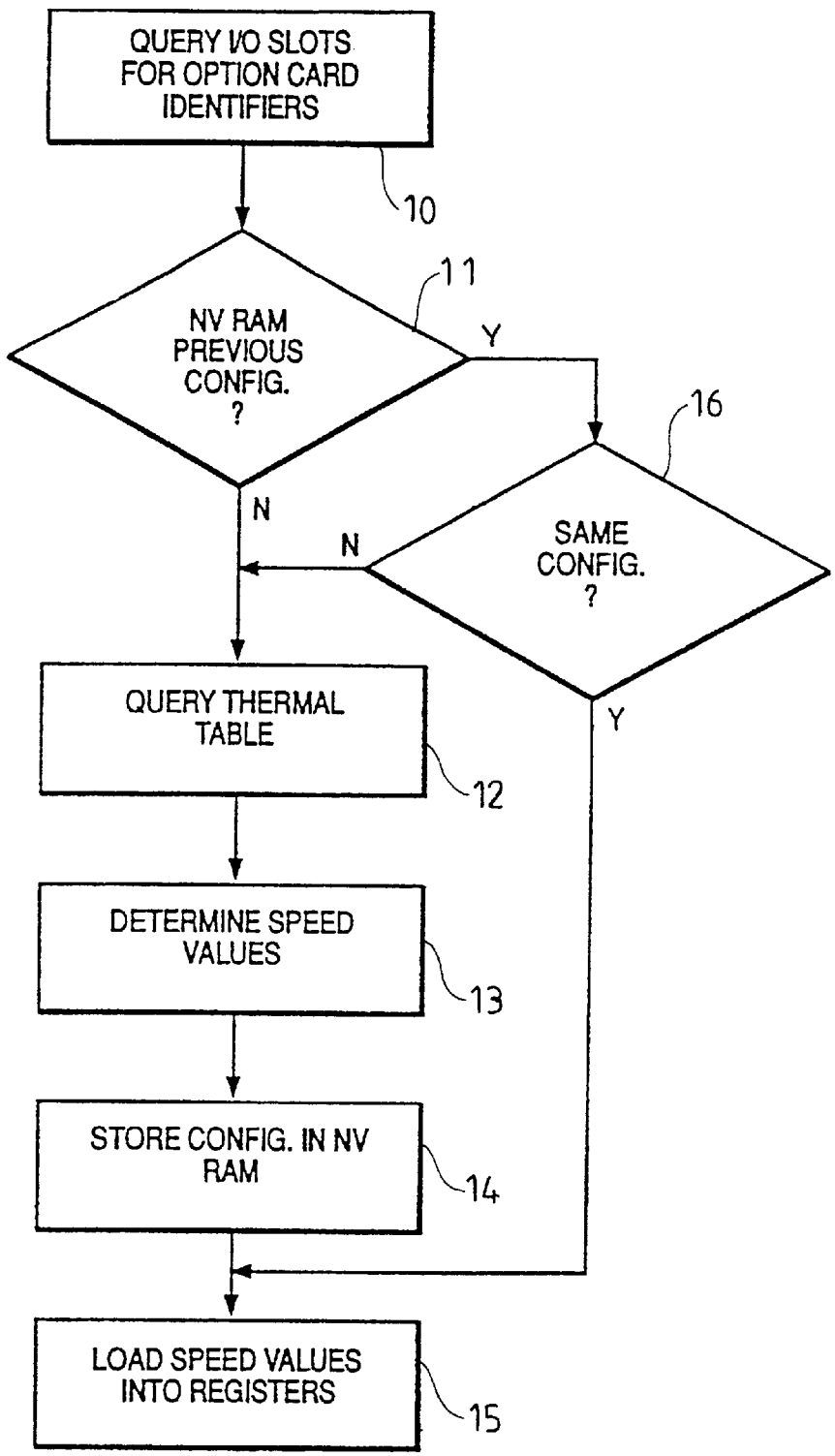
FIG. 1 is a flow chart illustrating how the speed values are determined for each fan according to prior art.

In conclusion, the automatic fan speed control disclosed in U.S. Pat. No. 5,249,741 (FIG. 1 of the drawings) can only update the thermal table by means of using the operating system to thereby determine the fan speed. Parameters such as fan state, actual speed, and fan speed set-up that may affect control of constant ambient temperature in the system are not taken into consideration. The system cannot modulate the fan speed to an optimal value and the fan speed varies all the time. By contrary, after starting of the fan 2, the present invention uses a microprocessor system 20 to continuously retrieve data in the register 22 for actual fan speed for comparison with a set-up data in the register 24 for speed set-up. Optimal fan state data and speed data for constant fan speed are outputted via the register 23 for fan state and the register 24 for speed set-up.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A fan motor with constant speed control by a microprocessor system, the fan motor comprising:

a fan outputting a speed signal;

a microprocessor system mounted between a power source and the fan, the microprocessor system controlling output of a drive voltage to the fan;

a register for actual fan speed, the register receiving the detected speed signal from the fan for retrieval by the microprocessor system, the register for actual fan speed being connected to the microprocessor system via a bus control logic;

a register for fan state connected to the microprocessor system via the bus control logic for storing data for output;

a register for speed set-up connected to the microprocessor system via the bus control logic for storing data for output;

a braking/running enabling control logic for controlling a fan state and the drive voltage to be outputted to the fan, the braking/running enabling control logic receiving fan state data stored in the register for fan state after processing by the microprocessor system and receiving speed data stored in the register for speed set-up after processing by the microprocessor system; and a linear variable voltage circuit control logic connected between the register for actual speed and the fan, the linear variable voltage circuit control logic being connected between the braking/running enabling control logic and the register for speed set-up, a set-up speed in the register for speed set-up forming a linearly varying drive voltage outputted to the braking/running enabling control logic for controlling output to the fan, the drive voltage being outputted to the fan via the linear variable voltage circuit control logic to maintain continuous linear fluctuation, thereby forming a smooth waveform;

wherein the microprocessor system is arranged to retrieve and process data of the detected speed signal in the register for actual fan speed and then to store the fan state data in the register for fan state and to store data for altering speed/drive voltage in the register for speed set-up; and wherein during retrieval and processing of data of the detected speed signal in the register for actual fan speed by the microprocessor system, when the fan speed is lower than a predetermined value, said drive voltage is outputted to keep the fan running at a constant speed.

2. The fan motor with constant speed control by a microprocessor system as claimed in claim 1, wherein the linear variable voltage circuit control logic samples an input clock to the fan as a sample frequency, and wherein the detected fan actual speed signal is outputted to the register for actual fan speed for retrieval by the microprocessor system.

3. The fan motor with constant speed control by a microprocessor system as claimed in claim 1, further comprising a bus control logic arranged to serve as a communication interface of the microprocessor system, the communication interface being one of an inter-integrated circuit bus and system management bus that provide communication by series data and series clock and that are connected to the register for actual fan speed, the register for fan state, and the register for speed set-up.

* * * * *